2 Sheets—Sheet 1.
B. E. SAMPSON.
Tongue-Support.
No. 906
Reissued Feb 21, 1860
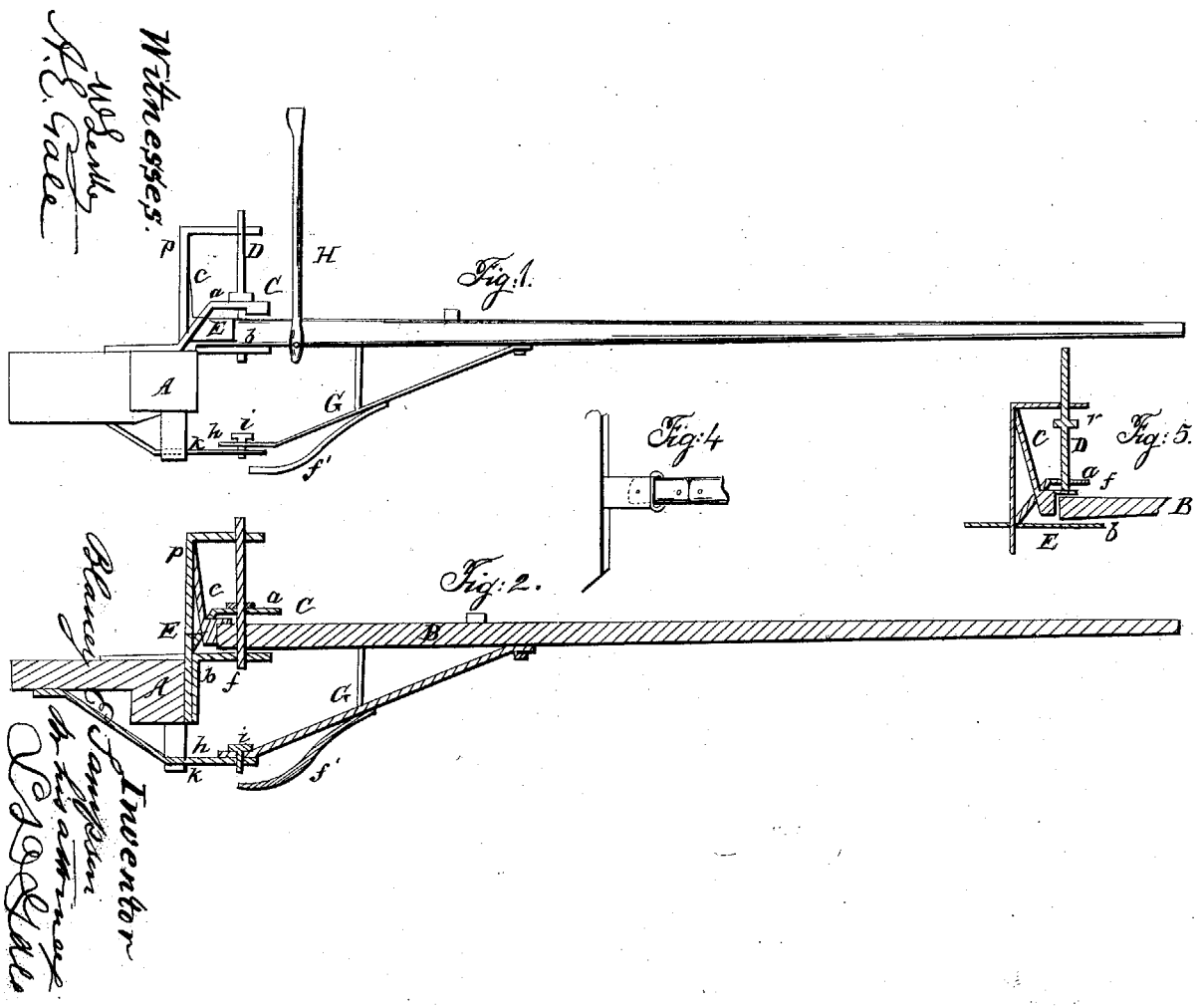
N. PETERS, PHOTO-LITHOGRAPHER, WASHINGTON, D. C.

2 Sheets—Sheet 2.
B. E. SAMPSON.
Tongue-Support.
No. 906. Reissued Feb 21, 1860.
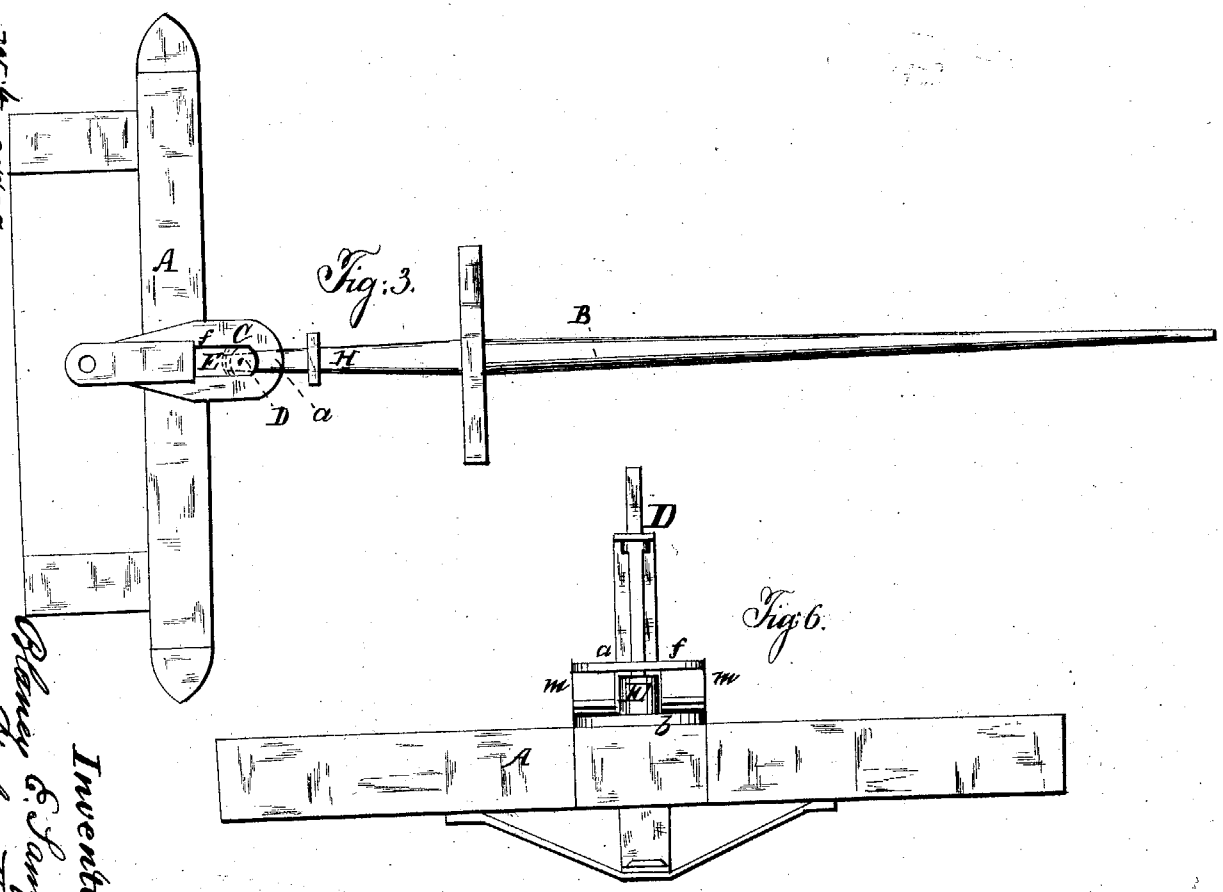
Witnesses
W. Leathe
A. C. Gale
Inventor
Blaney E. Sampson
by his attorney
L. S. Gale
N. PETERS, PHOTO-LITHOGRAPHER, WASHINGTON, D. C.

UNITED STATES PATENT OFFICE.

BLANEY E. SAMPSON, OF BOSTON, ASSIGNOR TO J. B. PROCTOR, OF FITCHBURG, MASSACHUSETTS.

IMPROVEMENT IN POLE-COUPLINGS FOR RAILROAD-CARS.

Specification forming part of Letters Patent No. 21,026, dated July 27, 1858; Reissue No. 906, dated February 21, 1860.

*To all whom it may concern:*

Be it known that I, BLANEY E. SAMPSON, of the city of Boston, in the county of Suffolk and Commonwealth of Massachusetts, have invented a new and useful Improvement in Coupling Apparatus for Attaching the Poles or Tongues of Horse-Railway Cars; and I hereby declare that the following is a full and exact description thereof, reference being had to the accompanying drawings and references marked thereon.

The nature of the invention is confined to the devices used for attaching, with greater facility than is usual, the pole to the cars, and for detaching the same with a like facility, the pole being made without a joint, and also for maintaining the pole in a horizontal or slightly-elevated position toward the small end when attached to the cars.

In the drawings, Figure 1 is a side view of the platform and pole and coupling apparatus. Fig. 2 is a vertical longitudinal and central section. Fig. 3 is a plan view. Fig. 4 represents the common construction of coupling in use, with a jointed pole and oblong mortise for receiving the same. Fig. 5 represents a sectional elevation of the upper portion of the coupling apparatus. Fig. 6 represents a front elevation of the platform and coupling apparatus, the pole being removed.

Similar figures and letters refer to the same parts throughout the drawings.

This improvement is marked and distinguished from others by three prominent features.

The first consists in making the pole in a single piece from end to end.

The second consists in making the mouthpiece, which projects out, forward from the center of the platform, of two expanded jaws, open in front and at the sides, so that the pole may be shipped and unshipped with almost the same facility, whether it rest in a position parallel with the line of the track or point to the right or to the left of that line.

A third feature in this invention consists in the use of an under and oblique brace which sustains the pole in a horizontal or somewhat upward inclined position when attached to the bunter of the car.

In the drawings, A is the platform; B, the pole to which the horses are attached; C, the bunter of the platform, and projects forward from the central anterior portion thereof. D is the bolt which fastens the pole to the car.

The bunter consists of two horizontal plates or jaws, *a* the upper and *b* the lower jaw, which are open and unobstructed at the sides and in front, for ease and facility in inserting and withdrawing the pole, as required in coupling and uncoupling the cars from the horses. This feature of the open jaws fits the coupling apparatus for receiving the pole, whether it be in a line parallel with the line of the track or any line of direction varying from that of the track to forty-five degrees, or even sixty degrees, on either side thereof. A bearing-block, E, attached to a spring, *c*, and made fast to the supporting-plate *p*, receives the end of the pole against its anterior face, which is made cylindrically concave, as seen by dotted lines in Fig. 3, also in Fig. 6, the cylindrical curve also corresponding with the convex cylindric end of the pole, as represented in the same Fig. 3. At the upper part of this bearing-block there is a forward projecting piece, *f*, which, when the bolt D is raised till its shoulders *r* strike against the top plate, projects directly over the pin-hole in the rear end of the pole B, and holds this pin D in place till the pole is thrust against the block E, pushing it back until projection *f* passes behind the pin D, when the latter drops into its place, passing through plate *a*, pole B, and plate *b*, as shown in Figs. 1 and 2.

Fig. 6 shows the elevated position of the pin, resting on the projection *f* in the upper part of the block E, while the projecting sides or cheeks of this block are seen in letters *m m*. This open space between plates *a* and *b* affords abundant room for attaching the pole to the car, whether the former be pointed directly forward, to the right, or to the left of it. Indeed, it is easy to effect the coupling in any part of the range of forty-five degrees on either side of the medial line of the car. This facility of making the coupling of the pole to the cars by means of the peculiar construction of the bunter apparatus entirely obviates the necessity of the old construction of the pole with an extra joint in it, as seen in Fig. 4. At *x* of the same figure is seen the small oblong opening for receiving the end of the pole. The process of coupling with this apparatus, but for the extra joint, would be a very difficult one. Besides this, the extra joint favors the inclination of the outer end of the pole toward the ground, while in the present improved arrangement the brace G sustains the pole constantly in a horizontal or slightly upward inclined position. This brace is of great importance as a saving of strength to the horses and keeping the weight from their necks and shoulders. It also preserves the pole at the same distance from the ground, allowing it to swing to the right or left of the medial line of direction. A guard, *f*, is attached to G and extends to the ground or near thereto, to protect and keep in order the part of the brace which would otherwise drag on the ground in transferring the horses and pole from one car to another. This brace G is fastened to the pole by a pin, *g*, and to the horizontal brace-piece *k* by pin *i*. In the rear end of brace G is a slot, *h*, (shown in Fig. 2,) by means of which the brace is easily withdrawn from under the head of the pin *i* when rod D is raised out of its hole.

H is a lifting-bar used by the driver, who stands on the platform, to guide the pole in making the coupling.

To perform the operation of coupling the pole to the car—usually termed "shackling the pole"—the end of brace G is dropped upon the plate *k* and pushed against pin *i*. While the end of the pole is pressed against the concave face of the block E, the projection *f* recedes, uncovering the pin-hole in the rear end of the pole, and pin D falls into its place and completes the coupling.

I am aware that it is not new to make cars self-shackling when brought together, and that carriage-poles are made without joints. I do not claim, therefore, either of these devices by themselves.

Having fully described the nature and operation of the invention and the mode of using the same, what I claim is—

1. Making the mouth or face of the bunter, between the plates *a* and *b*, entirely open at the sides and in front, so that the coupling of the pole may be easily made, whether it point directly forward or deviate to the right or to the left, substantially as herein set forth.

2. Sustaining the pole of a horse car in the proper position by means of the brace G, substantially as herein described.

BLANEY E. SAMPSON.

Witnesses:
E. F. HODGES,
WM. STANDISH.